United States Patent Office 3,342,159
Patented Sept. 19, 1967

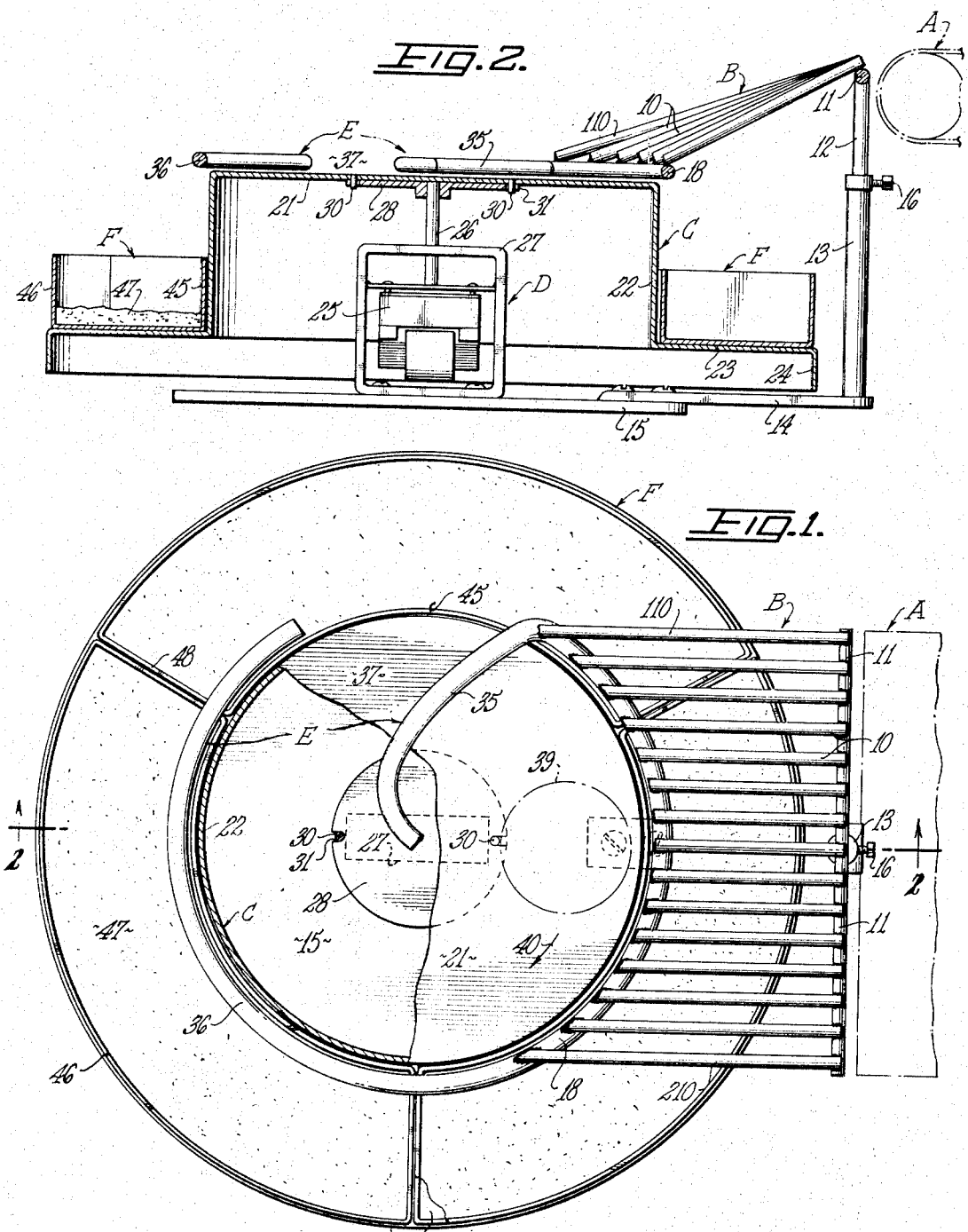

3,342,159
DONUT ICING APPARATUS
Stanley B. Jones, Torrance, Calif., assignor to Hol 'n One Donut & Supply Co., Inc., Los Angeles, Calif., a corporation of California
Filed Aug. 6, 1965, Ser. No. 477,732
17 Claims. (Cl. 118—28)

ABSTRACT OF THE DISCLOSURE

An apparatus for automatically icing or topping articles such as donuts and the like, wherein the articles are delivered, as by means of a conveyor, onto a rotating turntable which carries the articles in an arcuate path against guide finger which projects spirally over the turntable and deflects the articles over the periphery thereof, causing them to drop into an arcuate icing tray. The articles turn over as they drop into the tray, which is at such a level below the top surface of the turntable that the articles will land in the bed of icing in a fully inverted position, from which they may be removed by hand.

---

This invention relates to donut icing and has as its object to provide an apparatus for automatic icing of donuts.

An important object is to provide means adapted to receive donuts discharged from a donut cooker and to automatically ice them.

More specifically, the invention aims to provide an apparatus adapted to drop a succession of donuts face-down in one or more trays having icing therein, whereby to ice the donuts automatically. The donuts are then removed from the trays by an attendant operator.

A further object is to provide an apparatus adapted to efficiently spread out a series of donuts delivered from a donut cooker over a discharge chute, and then to distribute the donuts in spaced relation into one or more icing-containing trays.

Other objects and advantages will become apparent in the ensuing specification and appended drawing in which:

FIG. 1 is a plan view of a donut icing apparatus embodying the invention; and

FIG. 2 is a transverse sectional view thereof taken on the line 2—2 of FIG. 1.

Referring now to the drawing in detail, I have shown therein, as an example of one form in which the invention may be embodied, a donut icing apparatus adapted to receive a succession of donuts delivered from the end of a conveyor A of a donut cooker, said apparatus comprising, in general, a gravity chute B adapted to receive the donuts discharged from the conveyor A; a turntable C onto which the donuts are delivered by the chute B; a motor D including a reduction gearing for slowly rotating the turntable C; and guide mechanism E supported in a fixed position over the turntable C and operative, when engaged by donuts carried in a circular orbit by the turntable C, to guide the donuts in a path spiraling outwardly to the periphery of the turntable to a predetermined release point thus gaining circumferential spacing by increasing the traveled circumference in forcing the donuts outwardly; and to drop them over the periphery into icing trays F.

The gravity chute B preferably is of open-grid form, comprising a plurality of parallel rods 10, 110 and 210 anchored at their upper rear ends to a transverse cross head 11 forming a part of a T-shaped support including a stem 12 which is adjustably mounted in a tubular post 13 rising from a bracket 14 secured to a supporting base 15. Bars 110 and 210 are the side bars of the group. The stem 12 may be vertically adjusted in the post 13 and secured at any adjusted position by a set screw 16 or other suitable means for locking it to the post.

The rods 10 of the chute are of graduated length so that their inner ends are arranged in an arcuate array conforming to the periphery of the turntable C, said inner ends being secured to a correspondingly arcuate cross bar 18. For simplicity in construction, the guide mechanism E is formed as bent, integral continuations of the respective ends of the arcuate cross bar 18. The rods 10 extend diagonally downwardly from the support bar 11 to a common horizontal plane just above the flat upper surface of the turntable C, and since the bars at the outer sides of the chute are longer than the other bars, which are of progressively decreasing length from both sides to the center so as to conform to the arcuate periphery of the turntable, the bars 10 are pitched at successively steeper angles of declination from the sides toward the center of the chute, and thus are disposed successively lower below the common plane of the two outward bars 10 as shown in FIG. 2, and the chute is therefore arched downwardly toward the center from the respective side bars in the transverse cross section of the chute, thus providing a trough-shaped chute of convexly curved transverse section. This insures that the donuts will tend to gravitate toward the center of the chute as they slide downwardly onto the turntable, and that the donuts will not slide outwardly off the sides of the chute.

The turntable C comprises a hat section including a top wall which provides a flat circular platform 21 to receive and carry the donuts in a circular orbit; a cylindrical downwardly projecting skirt 22; and an annular collar 23 of flat ring form functioning as a ledge upon which the icing trays F are supported. At its outer end, the collar 23 has a reinforcing rim 24 extending downwardly.

The motor unit D is a simple type of small fractional horsepower electric motor including a suitable reduction gear unit 25 driven by the armature of the motor and having a driven shaft 26 extending upwardly through the frame 27 of the motor and carrying at its upper end a driving pad 28 on which the platform 21 of turntable C is supported. The turntable C can be readily removed from the motor and base unit by simply lifting it off of the driving pad 28 (after having first swung the chute B out of the way) such ready removal being provided for by dog clutch pins 30 secured to and projecting downwardly from the platform 21 and engageable in notches 31 in the circumference of the driving pad 28.

The guide mechanism E comprises a finger 35 bent inwardly from one end of the cross bar 18, and an arcuate arm 36 extending from the other end of the cross bar 18 as an arcuate continuation thereof following the contour of the periphery of turntable 22 and extending to a point opposite an intermediate part of the finger 35, from which it is spaced to define a donut-issuing mouth 37. The finger 35 is of spiral form, extending inwardly so as to cross successive radii of the rotational axis of the turntable at an acute angle which is preferably substantially uniform throughout at least a majority of the length of the finger 35.

In the operation of the apparatus, the turntable rotates in a clockwise direction, looking downwardly, as indicated by the arrow 40 of FIG. 1, and the donuts delivered by the chute B are deposited in an area 39 generally behind the inner end of the finger 35 and are thence carried in a circular orbit as indicated by arrow 40, around to the outer side of the finger 35 toward the exit mouth 37 defined between the finger 35 and the confining outer guide arm 36. The arm 36 will prevent premature movement of any donut over the margin of the turntable prior to reaching the exit mouth 37. As donuts, traveling the circular orbit, move into contact with the guide finger 35, they will be deflected outwardly toward the periphery of the turntable by the diagonal inclination of the finger 35 with reference to the circular path of orbiting travel of each donut. They will thus be deflected outwardly until they pass through the mouth 37 between the guide finger and guide arm, where they will drop off the periphery of the platform 21 and into one of the icing trays F. As the donuts are deflected outwardly, their circumferential spacing from one another in the succession of donuts will be gradually widened, and this circumferential spacing will be further widened as the donuts pass outwardly over the periphery of the platform 21, whereby as they drop into the trays F they will be adequately spaced in a circumferential direction so as to avoid any possibility of one donut dropping upon another and thus not properly contacting the bed of icing in the tray.

The height of the skirt 22 is such that a donut as it drops over the periphery of the platform 21 will turn over in the air, making a turn of 180°, with its previously upward side facing downwardly and entering the icing with the donut disposed in a substantially horizontal plane corresponding to that of the upper surface of the icing. Thus each donut is uniformly iced around its circumference.

The trays F are of arcuate form, with inner arcuate side walls 45 adapted to fit snugly against the skirt 22, and with arcuate outer walls 46 registering approximately with the rim 24 of the ledge 23. They are supported on the ledge without being otherwise attached to the turntable for cleansing.

Each tray is provided in its bottom with a bed of icing 47 to receive the falling donuts. The trays F are preferably three in number and each of 120° circumferential extent, although two, four or even more trays can be utilized, of arcuate extent such as to collectively form a substantially continuous annular array so that the end walls 48 of adjoining trays may substantially abut one another to minimize the likelihood of a donut being deposited on said end walls or in a postiion other than one lying facing down in the icing body 47.

In the operation of the apparatus, the upper outer end of the chute B is positioned in receiving relation to the delivery conveyor A of a cooker so that the donuts will be delivered off the conveyor A and onto the chute B. They will then slide downwardly onto the platform 21, where they will become arranged in a generally arcuate array extending from behind the finger 35. If successive donuts are touching each other as they pass from the chute 5 onto the platform 21, they will remain in such relative positions until they reach the guide finger 35, when as a result of being deflected outwardly, they will separate from one another circumferentially so that as they pass over the periphery of the platform 21 and drop into the trays they will be adequately spaced apart. After the donuts drop into the trays, they are removed by an operator.

When the apparatus is to be cleansed, after a period of use, the chute supporting stem 12 is loosened and removed from the post 13, the icing trays F are lifted off the ledge 23, and the turntable C is lifted off the driving pad 28. All of these parts can then be individually cleansed and return to assembled relation for another period of use.

I claim:

1. Food article topping apparatus comprising, in combination: a turntable including an elevated platform and an annular tray-supporting ledge connected to and rotatable with said platform and disposed radially outwardly of the periphery thereof and below the level thereof; means for depositing a succession of articles on said platform; means for rotating said turntable; and guide means disposed above said platform adjacent the top surface thereof and operable to deflect the articles carried on said platform outwardly to the periphery of the platform and over said periphery so as to drop into trays carried by said ledge, said guide means releasing said articles at a fixed position and said trays receiving said articles in circumferentially-spaced succession due to their circumferential movement beneath said fixed release position.

2. Apparatus as defined in claim 1, wherein said turntable includes a substantially cylindrical skirt extending downwardly from the periphery of said platform, said ledge being in the form of a flat ring projecting radially outwardly from the lower margin of said skirt.

3. Apparatus as defined in claim 1, including a plurality of arcuate trays removably supported on said ledge in annular, end-to-end array.

4. Donut icing apparatus comprising, in combination: a turntable including an elevated platform adapted to receive a succession of donuts thereon; tray-supporting means connected to and rotatable with said platform, said tray-supporting means being disposed below said platform and extending radially outwardly beyond its periphery; means for rotating said turntable; and guide means disposed above said platform adjacent the top surface thereof, and operable to deflect the donuts carried on said platform outwardly to the periphery of the platform and over said periphery so as to drop into trays carried by said tray supporting means, said guide means releasing said articles at a fixed position and said trays receiving said articles in circumferentially-spaced succession due to their circumferential movement beneath said fixed position.

5. Apparatus as defined in claim 4, wherein said guide means comprises a finger having means supporting it beyond the periphery of the platform, said finger extending inwardly to a point near the center of the platform along a contour crossing successive radii of the platform at an acute angle.

6. Apparatus as defined in claim 5, wherein said finger contour is a spiral of decreasing radius toward the center of the platform.

7. Apparatus as defined in claim 4, including a support and donut delivering means carried thereby and inclined downwardly and over said platform for depositing donuts thereon.

8. Donut icing apparatus comprising, in combination: a turntable including an elevated platform and an annular tray-supporting ledge, disposed radially outwardly of the periphery of said platform and below the level thereof; means for rotating said turntable; and guide means disposed above said platform adjacent the top surface thereof and operable to deflect the donuts carried on said platform outwardly to the periphery of the platform and over said periphery so as to drop into trays carried by said ledge, including a support and donut delivering means carried thereby and inclined downwardly and over said platform for depositing donuts thereon, said guide means comprising a finger mounted on said guide means and extending inwardly over the platform to a point near the center thereof, diagonally with respect to radii of the platform.

9. Donut icing apparatus comprising, in combination: a turntable including an elevated platform adapted to receive a succession of donuts and including tray-supporting means disposed below said platform rotatable therewith, and extending radially outwardly beyond its periphery; means for rotating said turntable; a plurality of arcuate icing-container trays removably mounted on said supporting means; and guide means supported in a fixed position above and closely adjacent to said platform in the path of orbiting movement of donuts deposited on said platform, said guide means extending diagonally with reference to radii of said platform so as to deflect the donuts outwardly over the periphery of the platform in response to the orbital movements imparted to the donuts by the rotating platform, said guide means releasing said articles at a fixed position and said trays receiving said articles in circumferentially-spaced succession due to their circumferential movement beneath said fixed position.

10. Apparatus as defined in claim 9, wherein said guide means includes a rod-like finger extending spirally inwardly to the center of the platform.

11. Apparatus as defined in claim 10, wherein said guide means further includes an arcuate arm extending from said chute around the outer periphery of said platform, in spaced relation to said finger.

12. Apparatus as defined in claim 9, wherein said trays are spaced below said platform a distance such as to receive said donuts when they have completed a half turn to inverted positions during their fall from the platform, whereby said donuts will receive on their inverted faces coatings of icing contained in said trap.

13. Donut-icing apparatus comprising, in combination: a base; a motor and reduction gear unit mounted thereon and having a slowly-driven shaft projecting upwardly; a turntable including a platform mounted on top of said shaft for rotation thereby, a cylindrical skirt extending downwardly from the periphery of said platform, and a tray supporting ledge of flat ring form integral with and projecting radially outwardly from the lower margin of said skirt and rotatable with said platform; a plurality of arcuate trays supported on said ledge at a depth below said platform such that each donut deflected off the periphery of said platform will turn over during its fall so as to land in an inverted position in a body of icing contained in one of said trays; and guide means disposed above said platform adjacent the top surface thereof and operable to deflect the donuts carried on said platform outwardly to the periphery of the platform and over said periphery so as to drop by free fall into said trays, said guide means releasing said articles at a fixed position and said trays receiving said articles in circumferentially-spaced succession due to their circumferential movement beneath said fixed release position.

14. Apparatus as defined in claim 13, including a pedestal rising from said base outwardly of the turntable; and delivery chute means mounted on said pedestal and extending downwardly and over the platform on an incline, for sliding a succession of donuts onto the platform from the delivery end of a donut cooker, said guide means comprising a finger mounted on said chute means at its outer end.

15. Apparatus as defined in claim 14, wherein said chute means comprises a plurality of spaced rods extending generally radially with reference to the turntable, said guide finger being an extension of an outer one of said chute rods.

16. Apparatus as defined in claim 15, wherein the outer rods of said chute means are disposed at a higher level than the inward rods thereof, to guide the donuts inwardly away from the sides of said chute means.

17. Apparatus as defined in claim 16, wherein said rods are parallel to a median axis of said chute means which is disposed in a radial plane of the rotational axis of said turntable.

References Cited

UNITED STATES PATENTS

| | | |
|---|---|---|
| 1,524,532 | 1/1925 | Biebel _____ 99—386 |
| 2,168,773 | 8/1939 | Parr _____ 99—423 |
| 2,767,641 | 10/1956 | Ackles _____ 99—409 X |
| 2,782,754 | 2/1957 | Bookidis _____ 118—13 |
| 2,878,776 | 3/1959 | Vogel _____ 107—54.7 X |
| 2,986,103 | 5/1961 | Flores _____ 99—423 X |
| 3,152,010 | 10/1964 | Case _____ 107—43 |

WALTER A. SCHEEL, *Primary Examiner.*

A. O. HENDERSON, *Assistant Examiner.*